United States Patent
Solomon et al.

(10) Patent No.: US 8,321,600 B2
(45) Date of Patent: *Nov. 27, 2012

(54) ASYMMETRICAL UNIVERSAL SERIAL BUS COMMUNICATIONS

(75) Inventors: Gary Solomon, Action, MA (US); Joseph Schaefer, Chandler, AZ (US); Robert A. Dunstan, Forest Grove, OR (US); Brad Saunders, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/981,979

(22) Filed: Dec. 30, 2010

(65) Prior Publication Data

US 2011/0106989 A1    May 5, 2011

Related U.S. Application Data

(63) Continuation of application No. 12/215,988, filed on Jun. 30, 2008.

(51) Int. Cl.
*G06F 3/00* (2006.01)
*G06F 13/00* (2006.01)

(52) U.S. Cl. .................. 710/8; 710/15; 710/29; 710/31; 710/33

(58) Field of Classification Search .................. None
See application file for complete search history.

(56) References Cited

U.S. PATENT DOCUMENTS

| 7,136,953 | B1 | 11/2006 | Bisson et al. |
| 7,136,963 | B2 | 11/2006 | Ogawa et al. |
| 2004/0015634 | A1* | 1/2004 | Alexander et al. ............ 710/305 |
| 2004/0029444 | A1 | 2/2004 | Tang |
| 2004/0218598 | A1* | 11/2004 | Kobayashi .................... 370/389 |
| 2004/0221077 | A1 | 11/2004 | Yen |
| 2005/0160212 | A1 | 7/2005 | Caruk |
| 2006/0168377 | A1* | 7/2006 | Vasudevan et al. ........... 710/104 |
| 2008/0046608 | A1* | 2/2008 | Lee et al. ......................... 710/30 |
| 2008/0098133 | A1 | 4/2008 | Shaanan et al. |

FOREIGN PATENT DOCUMENTS

| CN | 1417681 A | 5/2003 |
| CN | 2817114 Y | 9/2006 |
| JP | 10-105308 A | 4/1998 |
| JP | 2003-241870 A | 8/2003 |
| JP | 2004-334798 A | 11/2004 |
| JP | 2006-277361 A | 10/2006 |
| JP | 2008-017175 A | 1/2008 |
| JP | 2008-065818 A | 3/2008 |
| WO | 2005/072335 A2 | 8/2005 |

(Continued)

OTHER PUBLICATIONS

USB specification 2.0, Apr. 27, 2000, USB.org [online, accessed on Mar. 13, 2011], URL: http://www.usb.org/developers/docs/.*

(Continued)

*Primary Examiner* — Scott Sun

(74) *Attorney, Agent, or Firm* — International IP Law Group, P.L.L.C.

(57) ABSTRACT

In some embodiments a Universal Serial Bus cable includes a first differential pair to transmit bus signals, and a second differential pair to transmit bus signals in a same direction as the bus signals transmitted by the first differential pair. In this manner, a bandwidth of the Universal Serial Bus cable is doubled in that same direction. Other embodiments are described and claimed.

45 Claims, 3 Drawing Sheets

FOREIGN PATENT DOCUMENTS

| | | | |
|---|---|---|---|
| WO | 2005/072335 | A3 | 6/2006 |
| WO | 2007/002544 | A2 | 1/2007 |
| WO | 2007/143695 | A2 | 12/2007 |
| WO | 2008/018017 | A2 | 2/2008 |
| WO | 2010/002660 | A2 | 1/2010 |
| WO | 2010/002660 | A3 | 3/2010 |

OTHER PUBLICATIONS

International Search Report and Written Opinion received for PCT Patent Application No. PCT/US2009/048449, mailed on Feb. 5, 2010, 13 pages.

International Preliminary Report on Patentability received for PCT Patent Application No. PCT/US2009/048449, mailed on Jan. 13, 2011, 7 pages.

Office Action received for Japanese Patent Application No. 2010-550931, mailed on Jan. 24, 2012, 4 pages of Office Action including 2 pages of English Translation.

Office Action received for German Patent Application No. 112009000382.6, mailed on Mar. 15, 2011, 5 pages of Office Action.

Office Action received for United Kingdom Patent Application No. 1015979.6, mailed on Feb. 1, 2012, 4 pages.

Office Action received of Chinese Patent Application No. 200980110579.4, mailed on Jun. 29, 2012, 16 pages of Office Action including 10 pages of English Translation.

Notice of Allowance received for Japanese Patent Application No. 2010-550931, mailed on. Aug. 7, 2012, 2 pages including 1 page of English Translation.

* cited by examiner

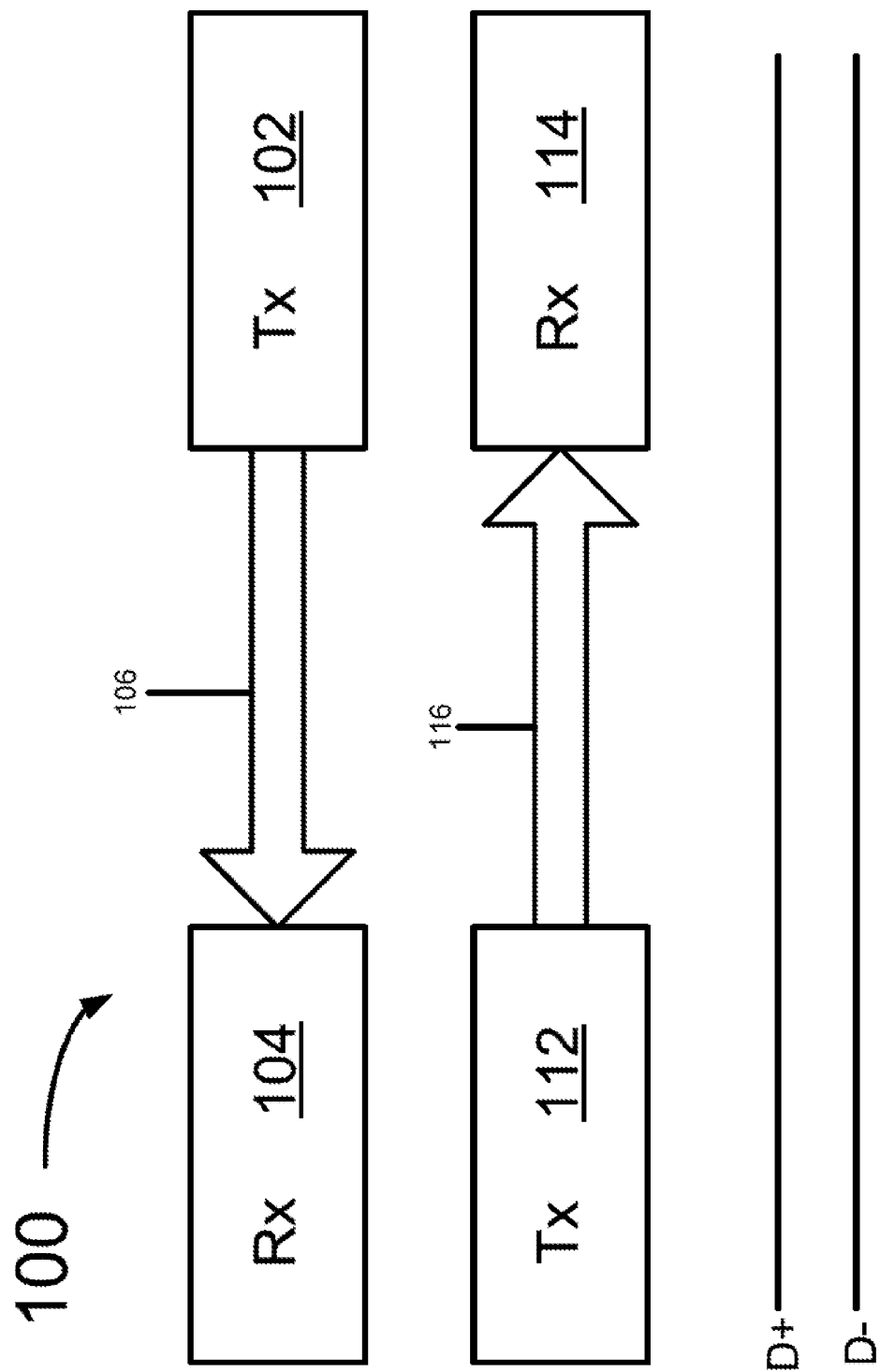

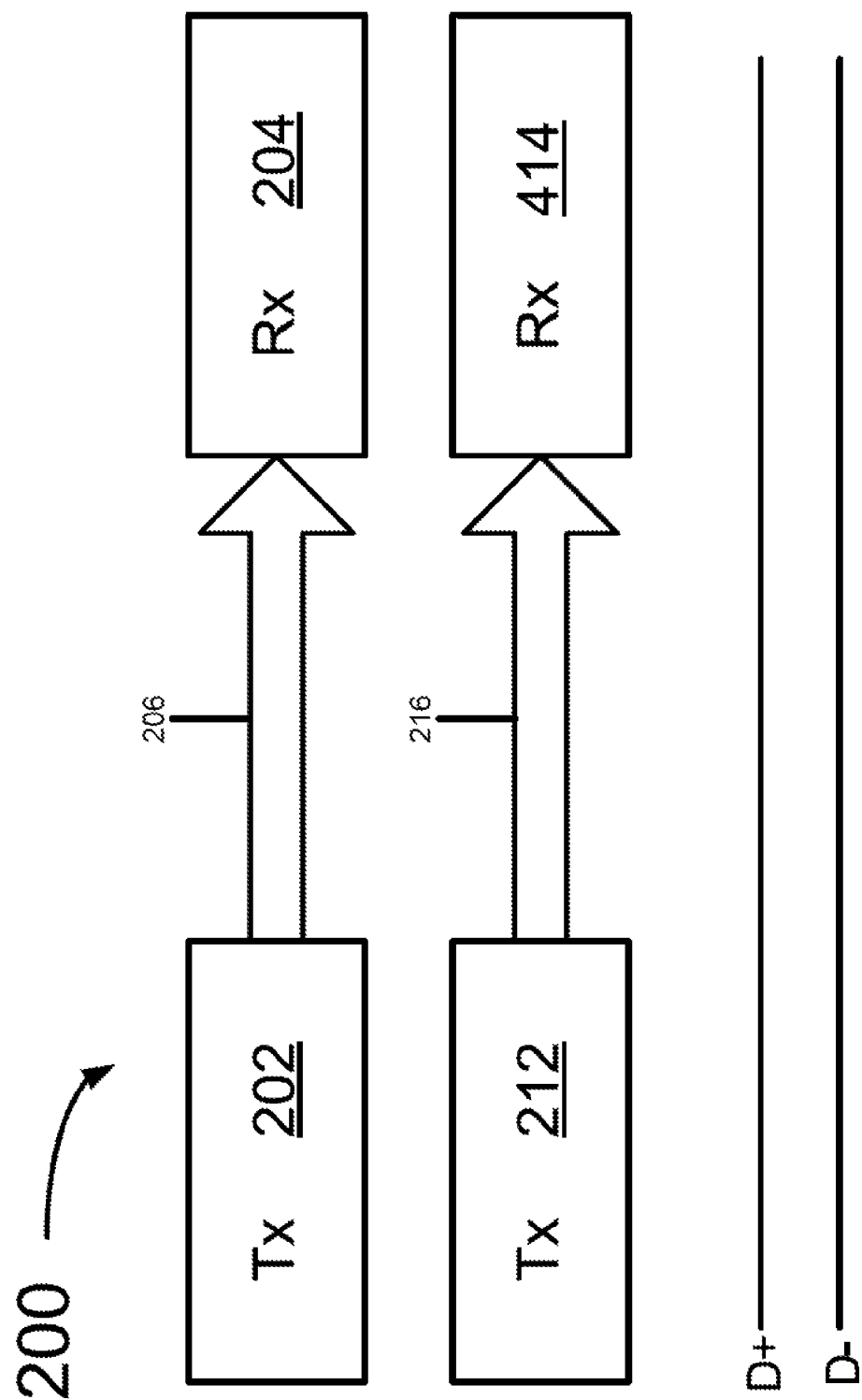

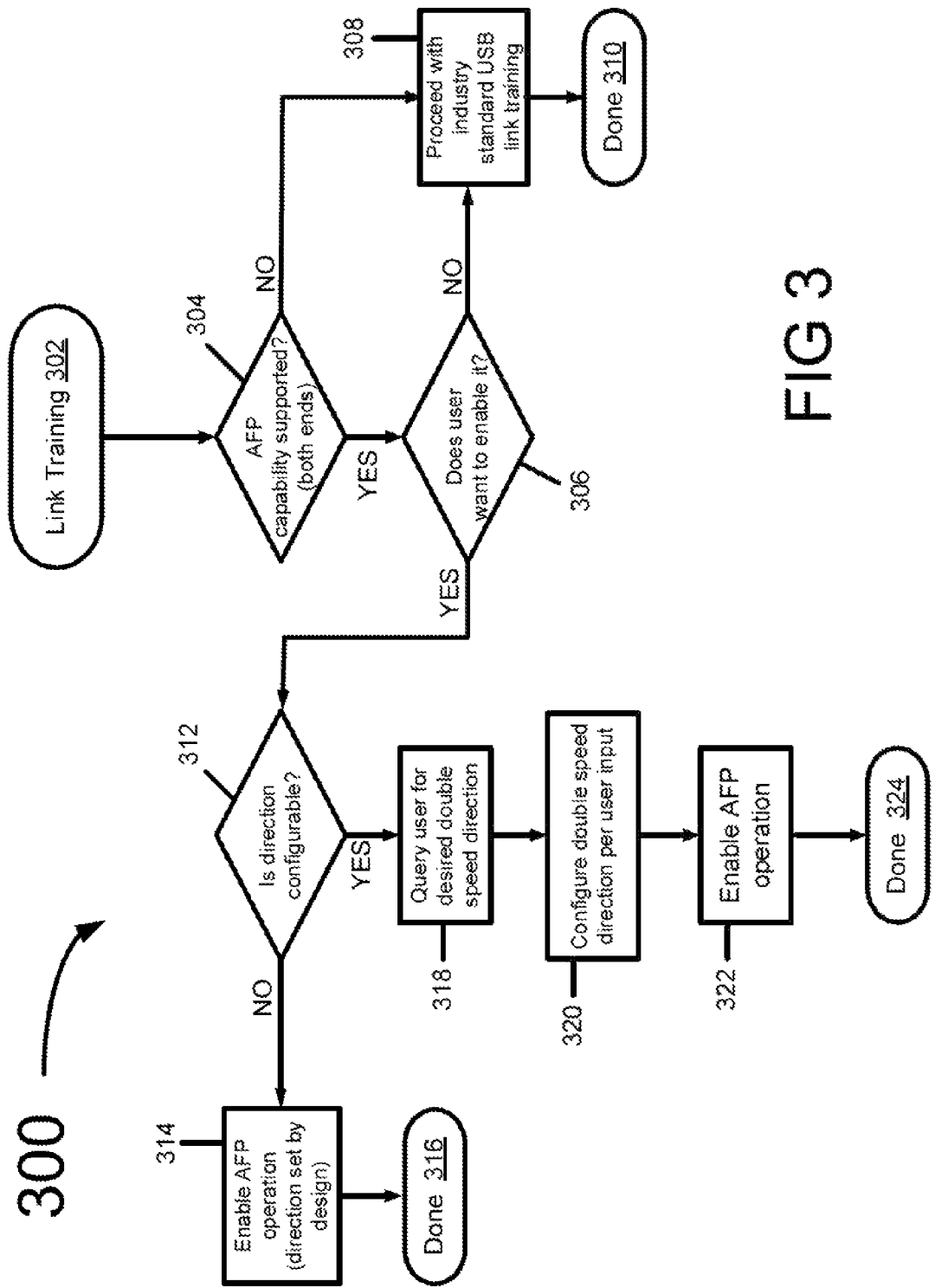

ASYMMETRICAL UNIVERSAL SERIAL BUS COMMUNICATIONS

RELATED APPLICATION

This application is a continuation of U.S. patent application Ser. No. 12/215.988 filed on Jun. 30, 2008 to Gary Solomon, Joe Schaefer, Robert A. Dunstan, and Brad Saunders and entitled "ASYMMETRICAL UNIVERSAL SERIAL BUS COMMUNICATIONS".

TECHNICAL FIELD

The inventions generally relate to asymmetrical Universal Serial Bus (USB) communications.

BACKGROUND

Universal Serial Bus (USB) is a widely used serial bus standard used to interface devices. USB was originally designed for computers as a plug-and-play interface between a computer and add-on devices such as, for example, audio players, joysticks, keyboards, digital cameras, scanners and printers, etc. However, the popularity of USB has prompted it to also become commonplace on other devices such as, for example, video game consoles, portable digital assistants (PDAs), portable digital video disk (DVD) and media players, cell phones, televisions (TVs), home stereo equipment such as MP3 players and iPods, car stereos, and portable memory devices. USB can be used to connect peripherals such as mouse devices, keyboards, gamepads, joysticks, scanners, digital cameras, printers, external storage, networking components, and many other devices.

As discussed above, USB is a serial bus standard to interface devices. USB is designed to allow many peripherals to be connected using a single standardized interface socket and to improve plug-and-play capabilities by allowing devices to be connected and disconnected without rebooting the computer. USB also provides power to low consumption devices eliminating the need for an external power supply. Common class drivers included with the operating system generally remove the need to install device drivers.

The USB 1.0 specification was introduced in November 1995. Starting in 1996, a few computer manufacturers started including USB support in their new machines, and it became widespread in 1998 when it was used as the primary connector on the original Apple iMac introduced in May 1998. The USB connector was used to replace many PS2, serial and parallel ports. USB 1.1 was introduced in September 1998 and is an external bus standard that supports data transfer rates of 12 Mbps (Megabits per second). USB 2.0, also known as High-speed USB, is an external bus that supports data rates up to 480 Mbps. USB 2.0 is fully compatible with USB 1.1, and uses the same cables and connectors. The USB 2.0 specification was released in April 2000.

A SuperSpeed USB rate of approximately 5 Gbps (Gigabits per second) is contemplated with the upcoming USB 3.0 specification. Therefore, USB 3.0 should allow for bus speeds ten times faster than USB 2.0. In addition to these faster speeds, the present inventors have been contemplating even faster bus speeds.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

FIG. 1 illustrates a system according to some embodiments of the inventions.

FIG. 2 illustrates a system according to some embodiments of the inventions.

FIG. 3 illustrates a flow according to some embodiments of the inventions.

DETAILED DESCRIPTION

Some embodiments of the inventions relate to asymmetrical Universal Serial Bus (USB) communications.

In some embodiments a Universal Serial Bus cable includes a first differential pair to transmit bus signals, and a second differential pair to transmit bus signals in a same direction as the bus signals transmitted by the first differential pair. In this manner, a bandwidth of the Universal Serial Bus cable is doubled in that same direction.

In some embodiments, a system includes a first Universal Serial Bus device, a second Universal Serial Bus device, and a Universal Serial Bus cable to couple the first Universal Serial Bus device and the second Universal Serial Bus device. The Universal Serial Bus cable includes a first differential pair to transmit bus signals and a second differential pair to transmit bus signals in a same direction as the bus signals transmitted by the first differential pair. In this manner, a bandwidth of the Universal Serial Bus cable is doubled in that same direction.

In some embodiments, a first differential pair of a Universal Serial Bus cable is enabled to point in a same direction as a second differential pair of a Universal Serial Bus cable. This allows bus signals to be transmitted on the first differential pair and on the second differential pair in the same direction. In this manner, a bandwidth of the Universal Serial Bus cable is doubled in that same direction.

FIG. 1 illustrates a system 100 according to some embodiments. In some embodiments system 100 includes a transmit block 102, a receive block 104, a transmission line 106 (for example, a differential pair), a transmit block 112, a receive block 114, a transmission line 116 (for example, a differential pair), and two other signal lines (labeled D+ and D− in FIG. 1).

In a USB implementation (for example, in a USB 3.0 implementation) a differentially driven receive block and a differentially driven transmit block of logic appoint opposite ends of a USB cable (for example, a USB 3.0 cable). In addition to the differentially driven transmit and receive blocks, a USB interconnect such as, for example, a USB 3.0 interconnect, includes two other signal lines (D+ and D−) used for link management and other lower bandwidth (for example, up to 480 Mbps) data communications applications.

USB 2.0 signals are transmitted on a twisted pair data cable (labeled D+ and D− in FIG. 1). These cables D+ and D− collectively use half-duplex differential signaling. D+ and D− usually operate together; they are not separate simplex connections. Transmitted signal levels are, for example, 0.0-0.3 volts for low and 2.8-3.6 volts for high in Full-speed (FS) and Low-speed (LS) modes, and ±400 mV in High-speed (HS) mode. USB 2.0 uses a special protocol to negotiate the High-speed mode called "chirping". In simplified terms, a device that is HS capable always connects as an FS device first, but after receiving a USB RESET (where both D+ and D− are driven LOW by the host) it tries to pull the D− line high. If the host (or hub) is also HS capable, it returns alternating signals on D− and D+ lines letting the device know that the tier will operate at High-speed.

SuperSpeed (for example, USB 3.0) is a dual simplex connection that supports concurrent in and out transactions. It's dual simplex signaling levels and spread spectrum clocking are compatible with another dual simplex serial interconnect, PCI Express™. Differential swing is approximately the same for USB 3.0 as for USB 2.0, but a spread clock is used as opposed to the on-spread USB 2.0 HS clock.

In the embodiments illustrated in FIG. 1, the two differential pairs point in opposite directions. However, in some embodiments, the capability is added for two differential pairs to point in the same direction, thereby doubling the bandwidth in that direction.

FIG. 2 illustrates a system 200 according to some embodiments. In some embodiments system 200 includes a transmit block 202, a receive block 204, a transmission line 206, a transmit block 212, a receive block 214, a transmission line 216, and two other signal lines (labeled D+ and D− in FIG. 2).

In a USB implementation (for example, in a USB 3.0 implementation) a differentially driven receive block and a differentially driven transmit block of logic appoint opposite ends of a USB cable (for example, a USB 3.0 cable). In addition to the differentially driven transmit and receive blocks, a USB interconnect such as, for example, a USB 3.0interconnect, includes two other signal lines (D+ and D−) used for link management and other lower bandwidth (for example, up to 480 Mbps) data communications applications. In some embodiments, USB signals are transmitted in system 200 in a manner similar to that illustrated and described in reference to FIG. 1.

In some embodiments, the system 200 of FIG. 2 allows for a USB solution (for example, a USB 3.0 solution) that provides two times the bandwidth of a USB cable in one direction than that allowed in that same direction by system 100 of FIG. 1. It is noted that in some embodiments (for example, in some embodiments of FIG. 2) while the bandwidth is doubled in one direction, it is decreased to 480 Mbps or less in the other direction. In some embodiments, in order to manage the link, communications over the low bandwidth direction are implemented for flow and link management functions (for example, in some embodiments, over a USB 2.0 wire). In some embodiments, such a lesser bandwidth communication path is available in a direction opposite the double bandwidth direction (for example, in some embodiments, over a USB 2.0 wire and/or over D+ and D− wires). In some embodiments, the lesser bandwidth communication path is bi-directional. That is, if the double bandwidth path is selected to be in one direction then in some embodiments, the lesser bandwidth communication path is selected to be in an opposite direction.

In some embodiments of FIG. 1, for example, a differentially driven receive block of logic (104 and/or 106) and a differentially driven transmit block of logic (102 and/or 202) are appointed at opposing ends of a USB cable. In some embodiments of FIG. 2, however, system 200 includes the capability of pointing both differential pairs in the same direction, thereby doubling the bandwidth in that particular direction. The additional signal lines D+ and D− illustrated in FIG. 2 continue to execute link management functions such as flow control protocol, power management protocol, runtime reversal of the double BW direction protocol handshake, etc., while also providing the data path in a direction opposite to the double bandwidth path. This results in an asymmetric bandwidth, allowing for an interconnect configured for asymmetrical fat pipe operation.

In some embodiments, asymmetrical fat pipe (AFP) operation is capable to enable double the bandwidth of a typical USB cable. For example, in some USB 3.0 embodiments, an asymmetric bandwidth of 10 Gbps is possible, compared to the standard, symmetrical bandwidth of 5 Gbps using typical USB 3.0 copper cables. In some embodiments, a stand alone USB cable (for example, stand alone USB 3.0 cable) with enhanced capabilities may be used (for example, with double asymmetrical bandwidth). In some embodiments, host to host communications over a USB cable (for example, USB 3.0 cable) may be implemented using enhanced capabilities (for example, with double asymmetrical bandwidth).

As discussed above, SuperSpeed (for example, USB 3.0) is a dual simplex connection that supports concurrent in and out transactions. According to some embodiments, such a dual simplex connection is capable of being turned around to make both pipes face in the same direction.

Thus, in some embodiments of FIG. 2, both pipes are turned around to face in the same direction in a SuperSpeed and/or USB 3.0 implementation. In some embodiments of FIG. 2, both pipes are turned around to face in the same direction in an implementation using a dual simplex connection.

FIG. 3 illustrates a flow 300 according to some embodiments. In some embodiments, flow 300 includes functionality of AFP (Asymmetrical Fat Pipe) Discovery, Enumeration, and/or Configuration, for example. These functions may use vendor specific provisions, for example.

In flow 300 link training begins at 302. At 304 a determination is made whether Asymmetrical Fat Pipe (AFP) capability is supported at both ends of a USB cable (for example, at both ends of a USB 3.0 cable). If AFP capability is supported at both ends of the USB cable, then a determination is made at 306 as to whether a user wants to enable the AFP capability. If AFP capability is not supported at both ends of the USB cable at 304 or if the user does not want to enable it at 306, then flow 300 proceeds with standard USB link training at 308 (for example, industry standard USB link training and/or standard USB 3.0 link training), and flow 300 is then done at 310.

If the user does want to enable AFP capability to be supported at both ends of the USB cable at 306, then a determination is made at 312 as to whether the direction of the AFP operation (that is, the direction of the double bandwidth, for example) is configurable. If the direction is not configurable at 312, then AFP operation is enabled at 314. In this case, the direction is set by design, for example. Flow then is done at 316.

If the direction is configurable at 312, then a query is sent to the user at 318 for the user's desired double speed direction. Then the double speed direction is configured at 320 as per the user input. AFP operation is then enabled at 322, and flow 300 is then done at 324. In this manner, according to some embodiments, flow 300 performs AFP discovery, enumeration, and configuration, for example.

In some embodiments, flow 300 may be implemented in software, in firmware, and/or in hardware. In some embodiments, flow 300 may be implemented completely or partially in the BIOS (Basic Input/Output System) firmware. In some embodiments, flow 300 may be implemented completely or partially in motherboard firmware. In some embodiments, flow 300 may be implemented completely or partially in the BIOS (Basic Input/Output System) firmware and/or may be implemented completely or partially in motherboard firmware.

In some embodiments, a bandwidth twice the industry standard is possible. In some embodiments, two channels in the same direction allow for a doubling of the bandwidth in that direction (for example, two 5 Gbps channels in a USB 3.0 implementation). In some embodiments, an existing USB cable (for example, a USB 3.0 cable) may be used to double the bandwidth. In some embodiments, a USB 3.0 cable that has been designed for 5 Gbs may be used to achieve 10 Gbs bandwidth. In some embodiments, USB 3.0 SuperSpeed technology is implemented.

In some embodiments, a lower bandwidth (BW) pipe may be used. In some embodiments, the lower BW pipe refers to USB 2.0 wires used in a USB 3.0 implementation in which the USB 2.0 wires are used for the back haul. USB transactions are generally a request followed by a response. For example, in a system including a host and a display device, the "fat pipe" (for example, transmission lines 206 and 216 in FIG. 2) is pointed toward the display device. Enumeration is a query on the fat pipe for the device to tell the host about itself. In some embodiments, this information is then provided from the device (in this example, the display) to the host on the USB 2.0 wires. In operation, assuming bulk transfers from the host to the device, the host sends, for example, video data to the device (display) over the fat pipe (for example, lines 206 and 216 in some embodiments) and the device acknowledges that data over the lower bandwidth pipe (for example, USB 2.0 wires). This differs from currently contemplated SuperSpeed and/or USB 3.0 operation where the acknowledgements would come over the symmetric connection (for example, the Tx-Rx pair from the device) to the host (that is, over the fat pipe rather than over a lesser bandwidth connection).

In some embodiments, for example, a mobile home platform chassis footprint may be streamlined by consolidating support for external audiovisual (A/V) connectivity down to a USB connector footprint (for example, a USB Type A connector footprint).

In some embodiments, system 100, system 200, and/or a USB cable with enhanced capabilities is coupled between two USB host devices (for example, between two USB 3.0 host devices). In some embodiments, system 100, system 200, and/or a USB cable with enhanced capabilities is coupled between a USB host device and a USB client device (for example, between a USB 3.0 host device and a USB 3.0 client device). In some embodiments, system 100, system 200, and/or a USB cable with enhanced capabilities is coupled between a USB host device and a USB hub device (for example, between a USB 3.0 host device and a USB 3.0 hub device). In some embodiments, system 100, system 200, and/or a USB cable with enhanced capabilities is coupled between a USB hub device and a USB client device (for example, between a USB 3.0 hub device and a USB 3.0 client device). In some embodiments, system 100, system 200, and/or a USB cable with enhanced capabilities is coupled between any USB devices (for example, between any USB 3.0 devices).

Although some embodiments have been described herein as being USB 3.0 embodiments or USB embodiments, according to some embodiments these particular implementations may not be required.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A Universal Serial Bus connector comprising:
    a first differential pair adapted to convey Universal Serial Bus signals; and
    a second differential pair adapted to convey Universal Serial Bus signals in a same direction as the Universal Serial Bus signals conveyed by the first differential pair, wherein a bandwidth of the Universal Serial Bus connector is asymmetric and is doubled in the same direction.

2. The Universal Serial Bus connector of claim 1, wherein the Universal Serial Bus connector is a USB 3.0 connector.

3. The Universal Serial Bus connector of claim 2, wherein the bandwidth of the USB 3.0 connector in the same direction is provided by two channels.

4. The Universal Serial Bus connector of claim 2, wherein the bandwidth of the USB 3.0 connector in the same direction is at least 10 Gbps.

5. The Universal Serial Bus connector of claim 1, wherein the first differential pair couples a first transmit block with a first receive block and wherein the second differential pair couples a second transmit block with a second receive block.

6. The Universal Serial Bus connector of claim 1, further comprising a lesser bandwidth communication path adapted to convey serial bus signals of less bandwidth than the doubled bandwidth in a direction opposite the same direction.

7. The Universal Serial Bus connector of claim 6, wherein the lesser bandwidth communication path is bi-directional.

8. The Universal Serial Bus connector of claim 6, wherein the lesser bandwidth communication path is selectively bi-directional.

9. The Universal Serial Bus connector of claim 6, wherein the lesser bandwidth communication path is to execute link management functions while also providing a data path in a direction opposite to the same direction of the double bandwidth path.

10. The Universal Serial Bus connector of claim 9, wherein the link management functions include one or more of flow control protocol, power management protocol, runtime reversal of the double bandwidth direction, and/or protocol handshake.

11. The Universal Serial Bus connector of claim 6, wherein the lesser bandwidth communication path is a USB 2.0 communication path.

12. The Universal Serial Bus connector of claim 1, wherein the Universal Serial Bus connector includes a Universal Serial Bus cable.

13. The Universal Serial Bus connector of claim 1, wherein the same direction of the first differential pair and/or the same direction of the second differential pair is configurable.

14. The Universal Serial Bus connector of claim 1, wherein the Universal Serial Bus connector is configured for asymmetrical fat pipe operation.

15. A system comprising:
    a first Universal Serial Bus device;
    a second Universal Serial Bus device; and
    a Universal Serial Bus connector to couple the first Universal Serial Bus device and the second Universal Serial Bus device, the Universal Serial Bus connector including:
        a first differential pair adapted to convey Universal Serial Bus signals; and
        a second differential pair adapted to convey Universal Serial Bus signals in a same direction as the Universal Serial Bus signals conveyed by the first differential pair, wherein a bandwidth of the Universal Serial Bus connector is asymmetric and is doubled in the same direction.

16. The system of claim 15, wherein the first Universal Serial Bus device is a USB 3.0 device, the second Universal Serial Bus device is a USB 3.0 device, and the Universal Serial Bus connector is a USB 3.0 connector.

17. The system of claim 15, wherein the Universal Serial Bus connector is a USB 3.0 connector, and the bandwidth of the USB 3.0 connector in the same direction is provided by two channels.

18. The system of claim 15, wherein the Universal Serial Bus connector is a USB 3.0 connector, and the bandwidth of the USB 3.0 connector in the same direction is at least 10 gigabits per second.

19. The system of claim 15, wherein the first differential pair couples a first transmit block with a first receive block and wherein the second differential pair couples a second transmit block with a second receive block.

20. The system of claim 15, wherein the first Universal Serial Bus device is one or more of a Universal Serial Bus host device, a Universal Serial Bus hub device, and/or a Universal Serial Bus client device.

21. The system of claim 20, wherein the second Universal Serial Bus device is one or more of a Universal Serial Bus host device, a Universal Serial Bus hub device, and/or a Universal Serial Bus client device.

22. The system of claim 15, the Universal Serial Bus connector further comprising a lesser bandwidth communication path in a direction opposite the same direction.

23. The system of claim 22, wherein the lesser bandwidth communication path is bi-directional.

24. The system of claim 22, wherein the lesser bandwidth communication path is selectively hi-directional.

25. The system of claim 22, wherein the lesser bandwidth communication path is to execute link management functions while also providing a data path in a direction opposite to the same direction of the double bandwidth path.

26. The system of claim 25, wherein the link management functions include one or more of flow control protocol, power management protocol, runtime reversal of the double bandwidth direction, and/or protocol handshake.

27. The system of claim 22, wherein the lesser bandwidth communication path is a USEI 2.0 communication path.

28. The system of claim 15, wherein the Universal Serial Bus connector includes a Universal Serial Bus cable.

29. The system of claim 15, wherein the same direction of the first differential pair and/or the same direction of the second differential pair is configurable.

30. The system of claim 15, wherein the Universal Serial Bus connector is configured for asymmetrical fit pipe operation.

31. A Universal Serial Bus connector comprising:
   a first transmitter adapted to transmit Universal Serial Bus signals; and
   a second transmitter adapted to transmit Universal Serial Bus signals in a same direction as the Universal Serial Bus signals transmitted by the first transmitter, wherein a bandwidth of the Universal Serial Bus connector is asymmetric and is doubled in the same direction.

32. The Universal Serial Bus connector of claim 31, wherein the Universal Serial Bus connector is a USB 3.0 connector.

33. The Universal Serial Bus connector of claim 32, wherein the bandwidth of the USB 3.0 connector in the same direction is provided by two channels.

34. The Universal Serial Bus connector of claim 32, wherein the bandwidth of the USB 3.0 connector in the same direction is at least 10 Gbps.

35. The Universal Serial Bus connector of claim 31, wherein the first transmitter is adapted to convey the Universal Serial Bus signals to a first differential pair and the second transmitter is adapted to convey the Universal Serial Bus signals to a second differential pair.

36. The Universal Serial Bus connector of claim 31, further comprising a first differential pair and a second differential pair, wherein the first transmitter is adapted to convey the Universal Serial Bus signals to the first differential pair and the second transmitter is adapted to convey the Universal Serial Bus signals to the second differential pair.

37. The Universal Serial Bus connector of claim 31, further comprising a lesser bandwidth communication path adapted to convey serial bus signals of less bandwidth than the doubled bandwidth in a direction opposite the same direction.

38. The Universal Serial Bus connector of claim 37, wherein the lesser bandwidth communication path is bi-directional.

39. The Universal Serial Bus connector of claim 37, wherein the lesser bandwidth communication path is selectively bi-directional.

40. The Universal Serial Bus connector of claim 37, wherein the lesser bandwidth communication path is to execute link management functions while also providing a data path in a direction opposite to the same direction of the double bandwidth path.

41. The Universal Serial Bus connector of claim 40, wherein the link management functions include one or more of flow control protocol, power management protocol, runtime reversal of the double bandwidth direction, and/or protocol handshake.

42. The Universal Serial Bus connector of claim 37, wherein the lesser bandwidth communication path is a USB 2.0 communication path.

43. The Universal Serial Bus connector of claim 31, wherein the Universal Serial Bus connector includes a Universal Serial Bus cable.

44. The Universal Serial Bus connector of claim 31, wherein the same direction of is configurable.

45. The Universal Serial Bus connector of claim 31, wherein the Universal Serial Bus connector is configured for asymmetrical fat pipe operation.

* * * * *